United States Patent
Morikawa et al.

(10) Patent No.: US 6,386,229 B1
(45) Date of Patent: May 14, 2002

(54) METHOD AND DEVICE FOR MANAGING OPERATION OF SOLENOID VALVE

(75) Inventors: Fumio Morikawa; Nobuyuki Ishitsuka; Makoto Ishikawa, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/597,410

(22) Filed: Jun. 19, 2000

(30) Foreign Application Priority Data

Jul. 16, 1999 (JP) .......................................... 11-203411

(51) Int. Cl.$^7$ .............................................. F16K 37/00
(52) U.S. Cl. .......................... 137/552; 137/554; 73/168
(58) Field of Search ................................ 137/551, 552, 137/554; 73/168

(56) References Cited

U.S. PATENT DOCUMENTS

| | | | | |
|---|---|---|---|---|
| 4,029,122 A | * | 6/1977 | Jaegtnes | 137/551 |
| 4,274,438 A | * | 6/1981 | Coste | 137/551 |
| 4,523,286 A | * | 6/1985 | Koga et al. | 137/551 X |
| 4,696,325 A | * | 9/1987 | Magee | 137/552 |
| 5,056,046 A | * | 10/1991 | Mutchler et al. | 137/551 X |
| 5,329,465 A | * | 7/1994 | Arcella et al. | 137/554 X |
| 5,329,956 A | * | 7/1994 | Marriott et al. | 137/552 X |
| 5,425,270 A | * | 6/1995 | McDonald et al. | 137/552 X |
| 5,469,737 A | * | 11/1995 | Smith et al. | 137/552 X |
| 5,492,009 A | * | 2/1996 | Kempf et al. | 137/551 X |
| 5,538,036 A | * | 7/1996 | Bergamini et al. | 137/552 |
| 5,616,829 A | * | 4/1997 | Balashak et al. | 137/551 X |
| 6,131,609 A | * | 10/2000 | Metso et al. | 137/552 |

FOREIGN PATENT DOCUMENTS

| | | |
|---|---|---|
| JP | 2-66784 | 5/1990 |
| JP | 2-66785 | 5/1990 |
| JP | 2-88079 | 7/1990 |

* cited by examiner

Primary Examiner—John Rivell
(74) Attorney, Agent, or Firm—Oblon, Spivak, McClelland, Maier & Neustadt, P.C.

(57) ABSTRACT

The present invention aims to permit an easy and reliable predicting of abnormality of a solenoid valve before failure, by detecting operating times of the solenoid valve and discriminating, from the operating times, whether the changeover operation thereof is normal or abnormal. To achieve this, the position of a spool at an stroke end, is detected by position detecting means adhered to the solenoid valve; the movement starting time from the time point when the driving signal for the solenoid valve is turned on or turned off, to the time point when the valve member begins to move from the stroke end, and the movement completion time therefrom to the time point when the spool arrives at the stroke end are measured in a signal processing circuit 12, from the detected position signal and the clock signal for measurement; whether the changeover operation of the valve member is normal or abnormal, is discriminated by comparing these operating times T1–T4 with a plurality of standard values T1$a$–T4$a$ and T1$b$–T4$b$ previously inputted in the signal processing circuit 12; and the display signal in response to the discrimination result is outputted.

10 Claims, 6 Drawing Sheets

METHOD AND DEVICE FOR MANAGING OPERATION OF SOLENOID VALVE

TECHNICAL FIELD

The present invention relates to means for managing the changeover operation of a solenoid valve, improved by permitting the detection of abnormality before a failure happens and taking precautions in advance by monitoring the changeover operation of the solenoid valve.

BACKGROUND ART

In assembling process of, for example, automobiles or other machinery, automatic operation system using compressed air is adopted, and numerous solenoid valves are used for the changeover of compressed air. In such an automatic operation system, operation is continued for a long time in order to increase an efficiency. Therefore, even if only one of the above-mentioned solenoid valve breaks down, the operation of the whole system would be shut down, and this would cause a serious damage. In addition, since the magnitude of the whole system is generally large, it takes a long time to identify the failed solenoid, and to repair or replace it. This would elongate the downtime of the system, and the damage thereby would make the damage more serious.

If a failure of a solenoid valve can be predicted in advance, this problem would be able to be solved. However, effective means therefor have not been proposed.

For example, Japanese Unexamined Utility Model Publication No. 2-66784 discloses a directional control valve wherein a magnet is installed on the outer periphery of a spool, and a magnetic sensor is mounted on a casing, and wherein the changeover of the spool is detected by detecting the magnet by the magnetic sensor.

However, this first known example can only detect whether the spool has been changed over or not. Therefore, if a signal notifying the changeover of the spool is not outputted, it means that the solenoid valve has already been out of working order. That is, this first known example can not predict a failure of a solenoid valve.

Also, Japanese Examined Utility Model Publication No. 7-31021 (Japanese Unexamined Utility Model Publication No. 2-88079) discloses another type of directional control valve wherein a magnet is installed on the piston coupled to an end of a spool, and a detection coil is mounted on a casing, and wherein an induced voltage generated in the detection coil due to the movement of the magnet is detected, whereby an abnormality being detected from the magnitude of this induced voltage. In other words, this is, in principle, of the type which detects the moving speed of the piston, or that of a spool as a induced voltage, and which detects an abnormality from the magnitude of the moving speed.

However, this second known example is of the type which detects the moving speed of the spool during a stroke, and which, if the spool does not move smooth, detects it as a failure. Therefore, for example, if the start of moving of the spool is delayed because of the adhesion of the spool to a stroke end, or if the arrival of the spool is delayed because of the increase in sliding resistance immediately before the arrival at a stroke end, it is impossible for this second known example to detect this abnormality and judge that it is out of working order.

DISCLOSURE OF INVENTION

The technical problem of the present invention is to provide operation managing means excellent in detecting accuracy, capable of easily and reliably predicting abnormality of a solenoid valve before failure happens, by detecting operating times of a solenoid valve and discriminating whether the changeover operation is normal or abnormal.

In order to solve the above-describe problems, in accordance with the present invention, there is provided a method for managing the operation of a solenoid valve, wherein operating positions of a valve member for flow passage changeover are detected by a position detecting means attached to the solenoid valve; wherein the operating time from the time point when the driving signal of the solenoid valve is turned on or turned off, to the time point when the valve member moves from a predetermined position or arrives thereat, is measured in a signal processing circuit, from the detected position signal and the clock signal for measurement; wherein whether the changeover operation of the valve member is normal or abnormal is discriminated by comparing these operating time with a plurality of standard values previously inputted in the signal processing circuit; and wherein the display signal in response to the discrimination result is outputted.

In accordance with the above-described method, the operating time from the time point when the solenoid valve is turned on or turned off, to the time point when the valve member moves from a predetermined position or arrives thereat, is measured, and whether the changeover operation of the valve member is normal or abnormal is discriminated from this operating time, and therefore, even if the start of the valve member from a stroke end or the arrival at a stroke end is delayed, it can be reliably detected as an abnormality.

In accordance with a specific embodiment of the present invention, the position at least one stroke end of the valve member is detected by the above-mentioned position detecting means, and at least one time is measured out of the time from the time point when the driving signal of the solenoid valve is turned on or turned off, to the time point when the valve member begins to move from the above-mentioned stroke end, and the time therefrom to time point when it arrives thereat.

In the present invention, the above-mentioned plural standard values comprise a first standard value which indicates the normal range of operating time, and a second standard value which indicates the range where the abnormality of operating time is predicted. When the operating time of the valve member is lower than or equal to the first standard value, a normal signal is outputted; when the operating time of the valve member is between the first standard value and the second standard value, an abnormality predicting signal is outputted; and when the operating time of the valve member is higher than the second standard value, an abnormal signal is outputted.

In accordance with the present invention to implement the above-described method, there is provided a device for managing a solenoid valve, comprising position detecting means which is attached to the solenoid valve and which detects operating positions of a valve member for flow passage changeover; a signal processing circuit for measuring the operating time of the valve member based on position signals from the position detecting means, and discriminating, from the operating time, whether the changeover operation of the valve member is normal or abnormal; wherein the signal processing circuit comprising a measuring section which begins to measure time using an on/off driving signal to a solenoid valve as a start signal, and which measures the operating time up to the changeover of the valve member based on the position signal outputted by said position detecting means; a comparing section which has a plurality of standard values for the preset operating times, and which discriminates whether the changeover operation of the valve member is normal or abnormal, by comparing the operating time of the valve member measured by said measuring section with these plural standard values; and a signal outputting section for outputting a display signal indicating whether the changeover operation of the valve member is normal or abnormal, based on the discrimination result obtained by said comparing section.

In accordance with a specific embodiment of the present invention, the above-described position detecting means is constituted so as to be able to detect the positions at both ends of the valve member; the measuring section of the signal processing circuit comprises a first measuring unit for measuring the time from the time point when the driving signal of the solenoid valve is turned on, to the time point when the valve member begins to move from a first stroke end, a second measuring unit for measuring the time therefrom to the time point when the valve member arrives at a second stroke end, a third measuring unit for measuring the time from the time point when the driving signal of the solenoid valve is turned off, to the time point when the valve member begins to return from the second stroke end, and a forth measuring unit for measuring the return time therefrom to the time point when the valve member arrives at the first stroke end; and the comparing section has first to forth comparators which are connected to above-described measuring units respectively and which compare the operating times measured by these measuring units with the plural standard values.

In the present invention, it is preferable that the above-described position detecting means comprises a magnet disposed so as to move in synchronization with the valve member, and at least one position sensor for detecting magnetic flux from said magnet, and that the position sensor is disposed so as to be able to detect magnetic flux from the magnet over the whole stroke of the valve member.

DETAILED DESCRIPTION OF THE INVENTION

Figure 1:
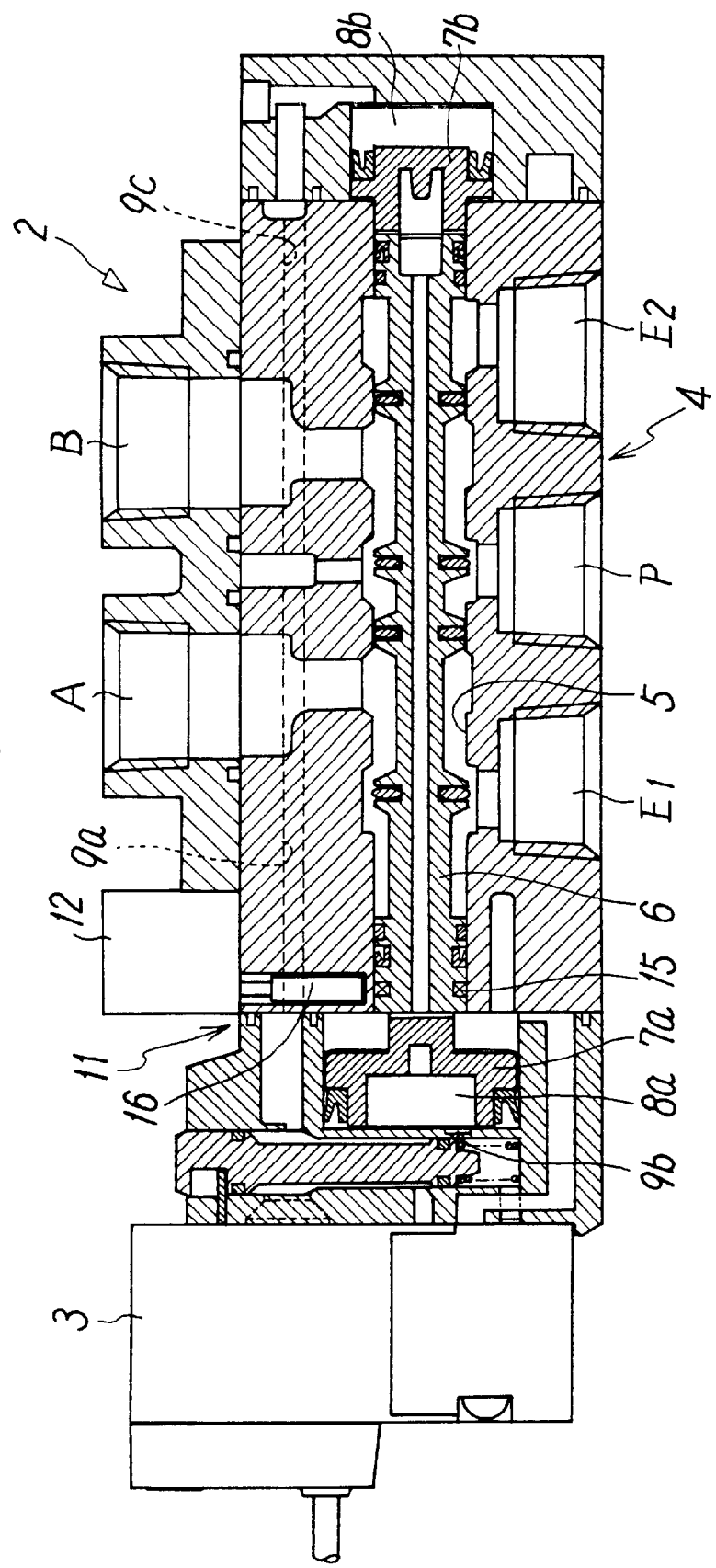
FIG. 1 is a longitudinal sectional view of a first embodiment of the solenoid valve to which the present invention is applied.

FIG. 1 shows the first embodiment of the solenoid valve to which present invention is applied. The solenoid valve 1 here exemplified is a single-pilot type solenoid valve wherein a main valve 2 is changed over by one pilot valve 3.

The solenoid valve 1 includes a casing 4 formed of non-magnetic material. Installed in this casing 4, are a plurality of ports P, E1, E2, A and B; valve hole 5 to which these ports is opened; a spool 6 which is a valve member for passage changeover and which is slidably received in the valve hole 5; two pistons, large and small 7a and 7b situated at both ends of the spool 6; and the above-mentioned pilot valve 3 which supplies pilot fluid for a first pressure chamber 8a on the side of the first piston 7a of large diameter and which is installed at the end portion adjacent to the first piston 7a, in the casing 4. The first pressure chamber 8a communicates with the supply port P through a pilot fluid passages 9a and 9b via the pilot valve 3, while a second pressure chamber 8b adjacent to a second piston of smaller diameter always communicates with the supply port P through a pilot fluid passages 9c.

In the above-described solenoid valve 1, when the pilot valve 3 is in the "off" state, that is, when the first pressure chamber 8a is not supplied with a pilot fluid, the second piston 7b is pushed by the pilot fluid pressure supplied to the second pressure chamber 8b, so that the spool 6 is situated at a first stroke end on the left side, as shown in FIG. 1. Once the pilot valve 3 is turned "on", that is, the first pressure chamber 8a is supplied with the pilot fluid, the spool 6 is pushed by the first piston 7a toward the right side shown in FIG. 1, so that the spool 6 moves to a second stroke end. This is because the acting force of fluid pressure acting on the first piston 7a is larger than that acting on the second piston 7b due to the difference in the pressure receiving area between the two piston 7a and 7b.

The solenoid valve 1 is provided with an operation managing device for managing the changeover operation of the above-described spool 6. The operation managing device comprises the position detecting means 11 for detecting operating positions of the spool 6 and a signal processing circuit 12 for measuring operating times of the spool 6 based on the position signal from the position detecting means 11 and discriminating, from this operating time, whether the changeover operation of the spool 6 is normal or abnormal. The signal processing circuit 12 may be disposed at a suitable position such as on the upper surface or on the side of the solenoid valve 1, as shown in drawings. Alternatively, the signal processing circuit 12 may be disposed on the base where the solenoid valve is mounted, or on the end block, port block, or power distribution block which are combined together when a plurality of solenoid valves are gathered, or at another suitable position.

Figure 2:
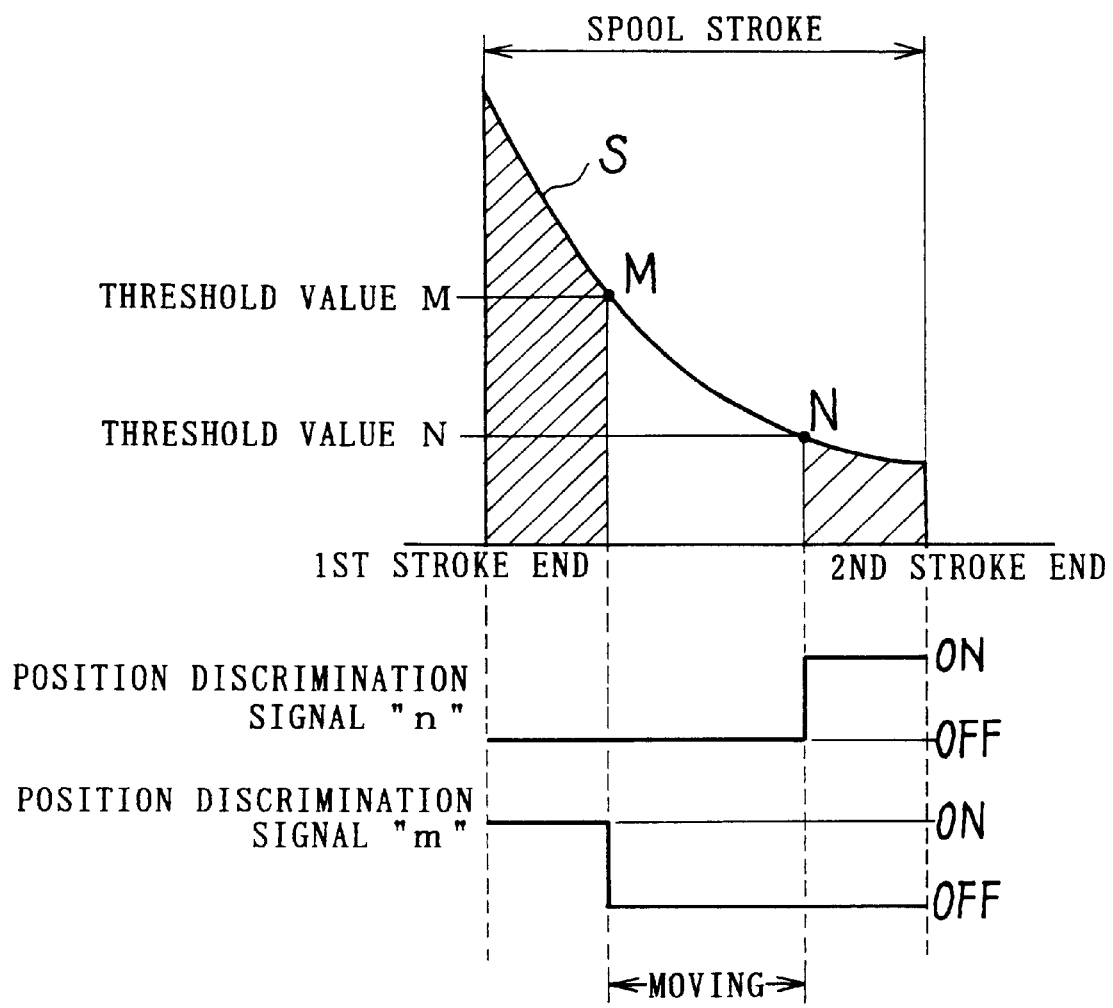
FIG. 2 is a diagram showing a position signal outputted from the position detecting means of the first embodiment.

The position detecting means 11 comprises a magnet 15 which is mounted on the spool 6 formed of non-magnetic material and which moves together with the spool 6, and a position sensor 16 which is mounted on a predetermined position of the casing 4 and which detects the change in magnetic flux density with the movement of the magnet 15. The position sensor 16 is disposed so as to be able to detect the magnetic flux density from the magnet 15 over the whole stroke of the spool 6, and as shown in FIG. 2, outputs a position signal S as an analog signal of which magnitude gradually decreases as the spool 6 moves from the first stroke end to the second stroke end.

Figure 3:
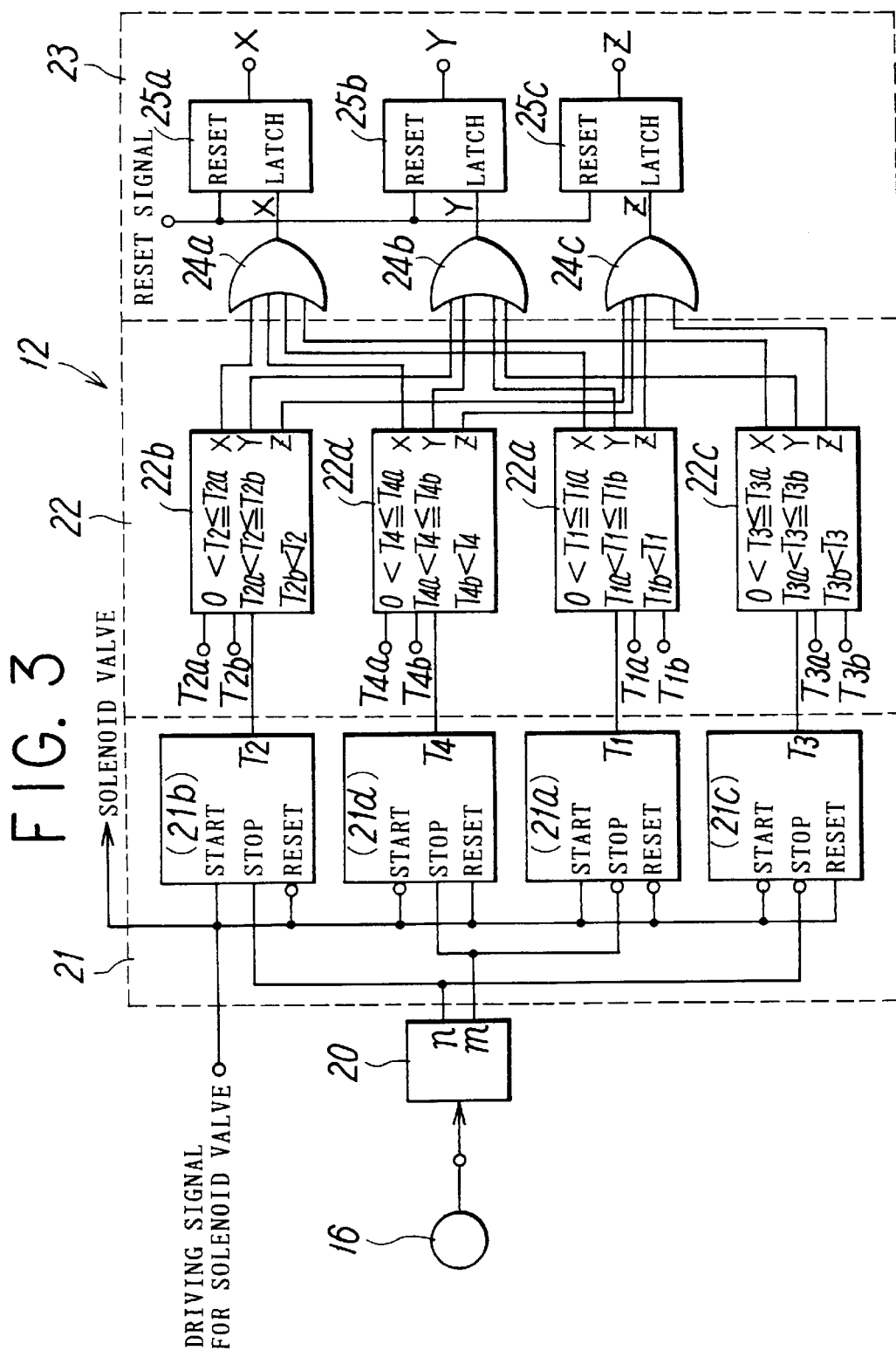
FIG. 3 is a block diagram showing a signal processing circuit.

On the other hand, the signal processing circuit 12 comprises a position discriminating unit 20, the measuring section 21, the comparing section 22, and a signal outputting section 23, as shown in FIG. 3.

The position discriminating unit 20 is connected to the position sensor 16. The position discriminating unit 20 determines threshold values M and N(see FIG. 2) to set a predetermined operating position to be time-measured, on the position signal S outputted by the above-mentioned position sensor 16, and when the operating position set by these threshold values M and N is detected, the position discriminating unit 20 outputs a position discrimination signal m and n for control to the measuring section 21 in the posterior stage.

This embodiment is constituted so as to detect the positions of the spool 6 at both stroke ends, by setting two threshold values M and N at the positions near both stroke ends on the position signals S. In the case where the driving signal for the solenoid valve 1 is turned on, that is, in the case where the spool 6 changes over from the first stroke end to the second stroke end, the above-mentioned position discrimination signal m is outputted by the position discriminating unit 20, as illustrated in FIG. 2, until the position signal S outputted by the position sensor 16 exceeds the threshold value M, that is, until the spool 6 begins to move. When the position signal S exceeds the threshold value M, that is, when the spool 6 begins to move, the position discrimination signal m is changed over to the "off" state. Further, when the position signal S arrives at the threshold value N, that is, when the spool 6 arrives at the second stroke end, the position discrimination signal n is changed over to the "on" state.

On the other hand, in the case where the driving signal for the solenoid valve 1 is turned off, that is, in the case where the spool 6 returns from the second stroke end to the first stroke end, the position discrimination signal n is outputted by the position discriminating unit 20, until the position signal S outputted by the position sensor 16 exceeds the threshold value N, that is, until the spool 6 begins to return. When the position signal S exceeds the threshold value N, that is, when the spool 6 begin to return, the position discrimination signal n is changed over to the "off" state. Further when the position signal arrives at the threshold value M, that is, when the spool 6 arrives at the first stroke end, the position discrimination signal m is changed over to the "on" state.

Meanwhile, the above-described measuring section 21 starts the time measurement by clock pulses by using the on/off driving signals for the solenoid valve 1 as a starting signal, and measures the operating time to the time point when the spool 6 arrives at a predetermined operating position, based on the position signals inputted through the position discriminating unit 20. These measurements are executed by first to forth measuring units 21a–21d connected to the position discriminating unit 20.

The first measuring units 21a is adapted to measure the operating time T1 from the time point when the driving signal for the solenoid valve 1 is turned on, to the time point when the spool 6 begins to move from the first stroke end. The first measuring unit 21a starts a measurement by counting clock pulses simultaneously with the inputting of the driving signal. When the spool 6 begins to move, that is, when the position discriminating signal m from the discriminating unit 20 is turned off, the first measuring unit 21a stops the measurement, thereby obtains the operating time T1, and outputs this measurement signal to the first comparator 22a which is a comparing section 22 in the posterior stage.

The second measuring units 21b is adapted to measure the operating time T2 from the time point when the driving signal for the solenoid valve 1 is turned on, to the time point when the spool 6 arrives at the second stroke end. The second measuring unit 21b starts a measurement by counting clock pulses simultaneously with the inputting of the driving signal. When the spool 6 arrives at the second stroke end, that is, when the position discriminating signal n from the position discriminating unit 20 is turned on, the second measuring unit 21b stops the measurement, thereby obtains the operating time T2, and outputs this measurement signal to the second comparator 22b which is a comparing section 22 in the posterior stage.

The third measuring units 21c is adapted to measure the operating time T3 from the time point when the driving signal for the solenoid valve 1 is turned off, to the time point when the spool 6 begins to return from the second stroke end. The third measuring unit 21c starts a measurement by counting clock pulses simultaneously with the inputting of the off driving signal. When the spool 6 begins to return, that is, when the position discriminating signal n from the discriminating unit 20 is turned off, the third measuring unit 21c stops the measurement, thereby obtains the operating time T3, and outputs this measurement signal to the third comparator 22c which is a comparing section 22 in the posterior stage.

The forth measuring units 21d is adapted to measure the operating time T4 from the time point when the driving signal for the solenoid valve 1 is turned off, to the time point when the spool 6 returns to the first stroke end. The forth measuring unit 21d starts a measurement by counting clock pulses simultaneously with the inputting of the off driving signal. When the spool 6 arrives at the return stroke end, that is, when the position discriminating signal m from the discriminating unit 20 is turned on, the forth measuring unit 21d stops the measurement, thereby obtains the operating time T4, and outputs this measurement signal to the forth comparator 22d which is a comparing section 22 in the posterior stage.

The comparing section 22 is adapted to be able to set a plurality of standard values for the operating time of the spool 6, and discriminates whether the changeover operation of the spool 6 is normal or abnormal by comparing the operating times T1–T4 measured by the measuring units 21a–21d with these plural standard values. The comparator 22 comprises first to forth comparators 22a–22d.

The first comparator 22a is adapted to be able to set, regarding the operating times T1 measured by the first measuring unit 21a, the first standard value T1a which indicates the upper limit of normal operating times, and the second standard value T1b which is higher than the first standard value and which indicates the upper limit of the abnormality-predicted time which is not abnormal but is in the prestage of an abnormality. The first comparator 22a compares the operating time T1 with these standard values. If the operating time T1 is lower than or equal to the first standard value T1a, i.e., $(0<T1 \leq T1a)$, the first comparator 22a outputs a normal signal X. If the operating time T1 is higher than the first standard value T1a, and lower than or equal to the second standard value T1b, i.e., $(T1a<T1 \leq T1b)$, the first comparator 22a outputs a abnormality predicting signal Y. If the operating time T1 is higher than the second standard value T1b, i.e., $(T1b<T1)$, the first comparator 22a outputs a abnormal signal Z.

The second comparator 22b is adapted to be able to set, regarding the operating times T2 measured by the second measuring unit 21b, the first standard value T2a which indicates the upper limit of normal operating times, and the second standard value T2b which indicates the upper limit of the abnormality-predicted time. The second comparator 22b compares the operating time T2 with these standard values. If the operating time T2 is lower than or equal to the first standard value T2a, i.e., (0<T2≦T2a), the second comparator 22b outputs a normal signal X. If the operating time T2 is higher than the first standard value T2a, and lower than or equal to the second standard value T2b, i.e., (T2a<T2≦T2b), the second comparator 22b outputs a abnormality predicting signal Y. If the operating time T2 is higher than the second standard value T2b, i.e., (T2b<T2), the second comparator 22b outputs a abnormal signal Z.

The third comparator 22c is adapted to be able to set, regarding the operating times T3 measured by the second measuring unit 21b, the first standard value T3a which indicates the upper limit of normal operating times, and the second standard value T3b which indicates the upper limit of the abnormality-predicted time. The third comparator 22c compares the operating time T3 with these standard values. If the operating time T3 is lower than or equal to the first standard value T3a, i.e., (0<T3≦T3a), the third comparator 22c outputs a normal signal X. If the operating time T3 is higher than the first standard value T3a, and lower than or equal to the second standard value T3b, i.e., (T3a<T3<T3b), the third comparator 22c outputs a abnormality predicting signal Y. If the operating time T3 is higher than the second standard value T3b, i.e., (T3b<T3), the third comparator 22c outputs a abnormal signal Z.

The forth comparator 22d is adapted to be able to set, regarding the operating times T4 measured by the second measuring unit 21b, the first standard value T4a which indicates the upper limit of normal operating times, and the second standard value T4b which indicates the upper limit of the abnormality-predicted time. The forth comparator 22d compares the operating time T4 with these standard values. If the operating time T4 is lower than or equal to the first standard value T4a, i.e., (0<T4≦T4a), the forth comparator 22d outputs a normal signal X. If the operating time T4 is higher than the first standard value T4a, and lower than or equal to the second standard value T4b, i.e., (T4a<T4≦T4b), the forth comparator 22d outputs a abnormality predicting signal Y. If the operating time T4 is higher than the second standard value T4b, i.e., (T4b<T4), the forth comparator 22d outputs a abnormal signal Z.

Figure 4:
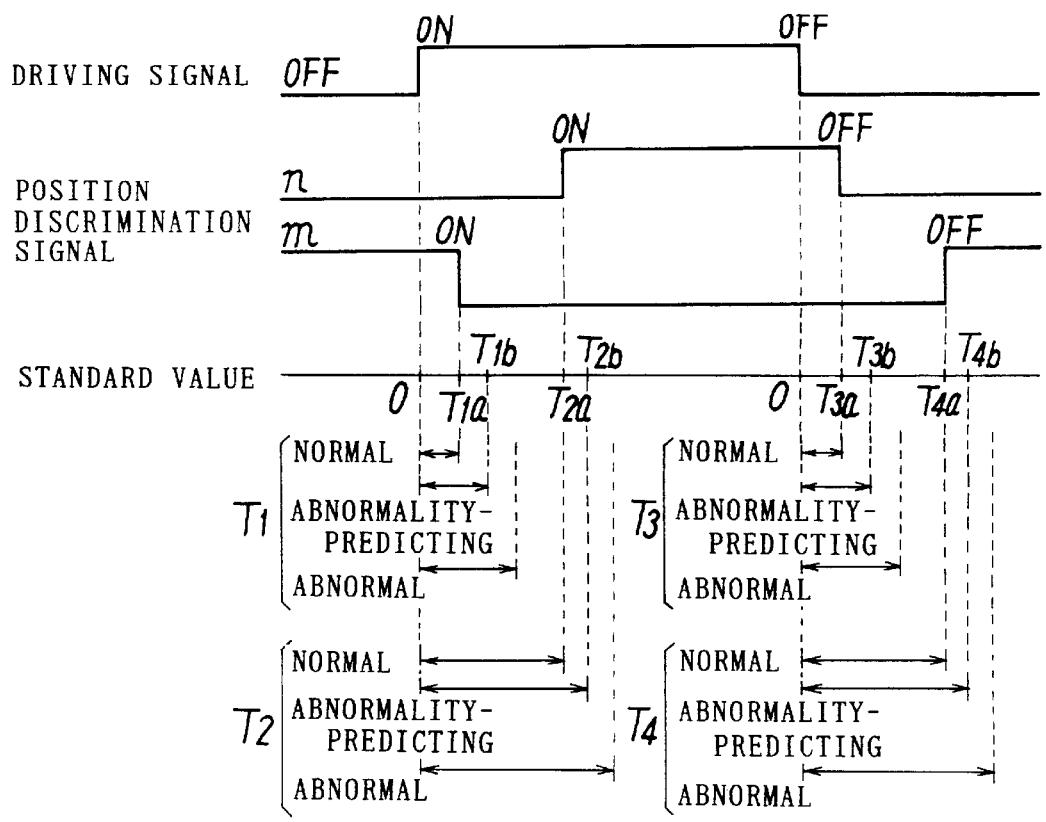
FIG. 4 is a timing chart showing the timing of signal processing.

The timing of the operation of each of these measuring units 21a–21d and comparators 22a–22d is illustrated in FIG. 4.

The above-mentioned signal outputting section 23 outputs a display signal for displaying whether the operating time is normal or abnormal based on the discrimination results by the above-described comparators 22a–22d. The signal outputting section 23 is provided with first to third OR circuits 24a–24c and first to third latch circuits 25a–25c connected the OR circuits 24a–24c, respectively.

The first OR circuit 24a is adapted to receive a normal signal X from the first to forth comparators 22a–22d, and to output an operation signal to the first latch circuit 25a upon receipt of an input signal from any comparator.

The second OR circuit 24b is adapted to receive an abnormality predicting signal Y from the first to forth comparators 22a–22d, and to output an operation signal to the second latch circuit 25b upon receipt of an input signal from any comparator.

The third OR circuit 24c is adapted to receive an abnormal signal Z from the first to forth comparators 22a–22d, and to output an operation signal to the third latch circuit 25c upon receipt of an input signal from any comparator.

When receiving a signal from the OR circuits 24a–24c, each of the latch circuits 25a–25c outputs a signal such as a normal signal X, an abnormality predicting signal Y, or an abnormal signal Z toward a controller or display (not shown). In this case, the signal processing circuit 12 may be constituted so as to have a communication circuit, and to perform communication through this circuit.

Here, each of the latch circuits 25a–25c is connected to the controller, and is adapted to be reset by a reset signal from this controller.

Thus, even if the spool is delayed in starting from an stroke end or arriving at a stroke end, it is possible to reliably detect it as the state to be predicted to be a prestage of abnormality, or as the abnormal state, by measuring the operating time from the time point when the solenoid valve 1 is turned on or turned off, to the time point when the spool 6 is changed over, and discriminating, from this operating time, whether the changeover operation is normal or abnormal. Therefore, if the changeover operation of the spool is judged to be in the state to be predicted as a prestage of abnormality, or in the abnormal state, it is possible to immediately take measures for a preventive maintenance depending on the degree of the abnormality, before an accident such as a failure actually arises. This permits the enhancement of safety and reliability in the case where an automatic operation system is performed over a long time.

Even in the event of failure, since the failure location is easily identified by the signal from the solenoid valve, the failure can be rapidly recovered and the damage caused by the shutdown of the system can be minimized.

Figure 5:
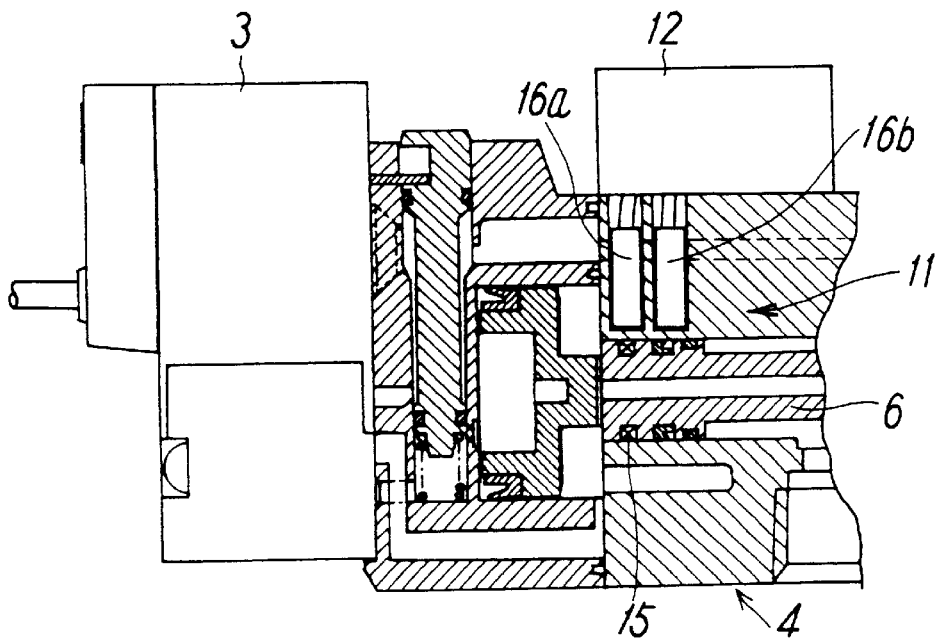
FIG. 5 is a longitudinal sectional view of the main section of a second embodiment of the solenoid valve to which the present invention is applied.
Figure 6:
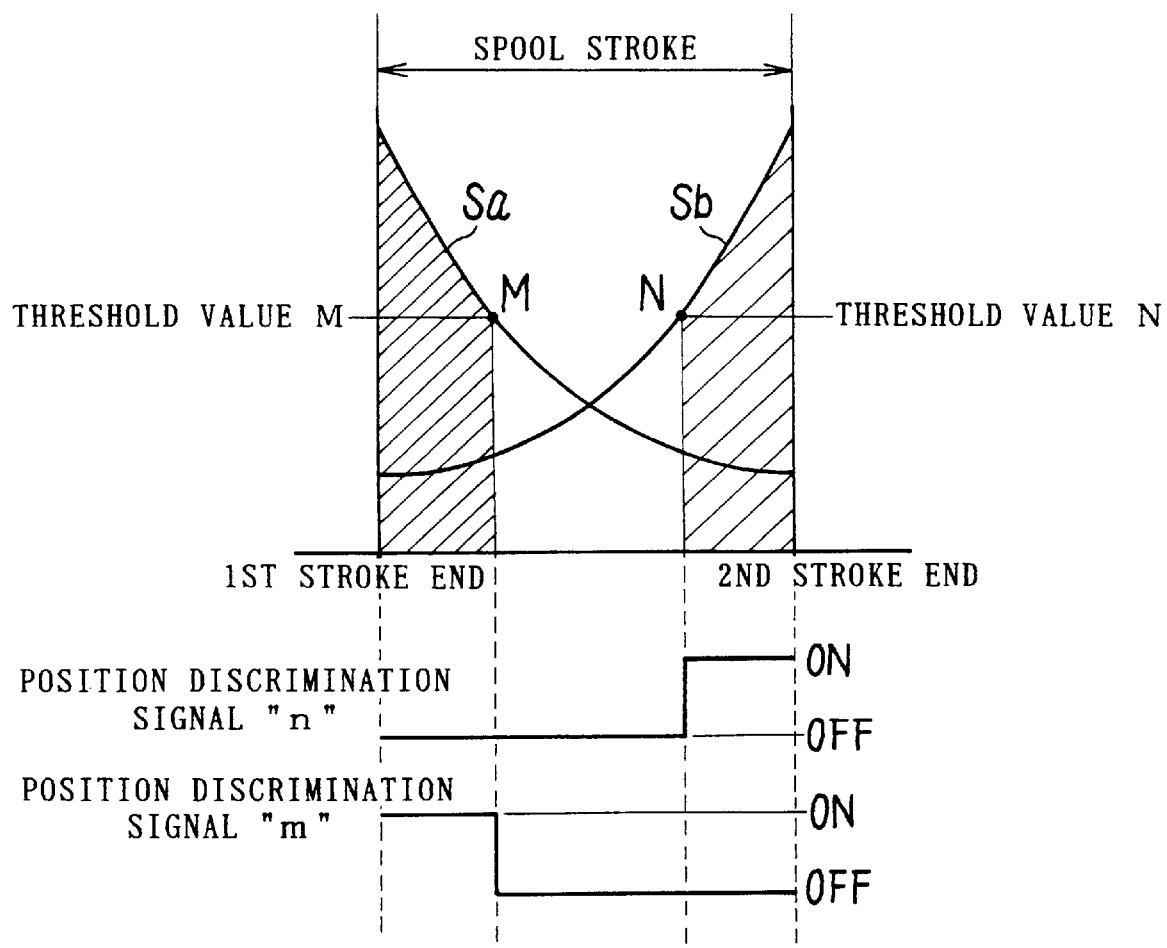
FIG. 6 is a diagram showing position signals outputted from the position detecting means of the second embodiment.

In the above-described embodiment, explanation was made of the case where the position detecting means 11 has single position sensor 16, but the position detecting means 11 may have a plurality of position sensors as in the second embodiment shown in FIG. 5. In this case, two position sensors 16a and 16b are each disposed so as to face the magnet 15 at both stroke ends of the spool 6, in order to obtain, from the position sensor 16a and 16b, two position signals Sa and Sb having a symmetric form as shown in FIG. 6. By setting the two threshold values M and N on these two position signals Sa and Sb, the positions at both stroke ends can be detected.

Since the constitution and operation of the second embodiment other than the foregoing are substantially the same as those of the first embodiment, explanation thereof is omitted.

Figure 7:
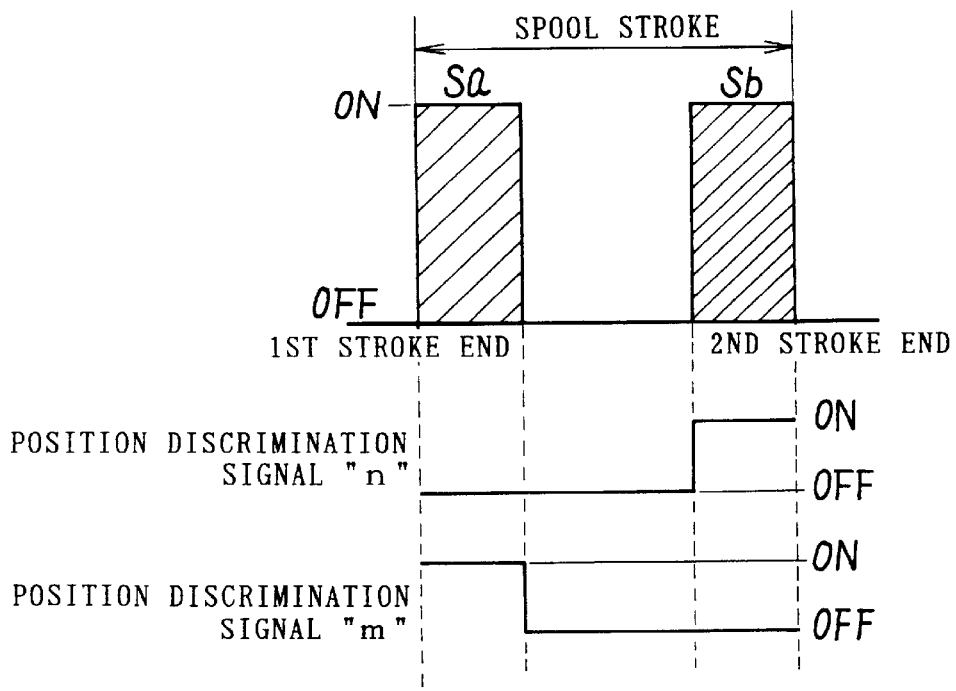
FIG. 7 is a diagram showing another position signal applicable to the present invention.
Figure 8:
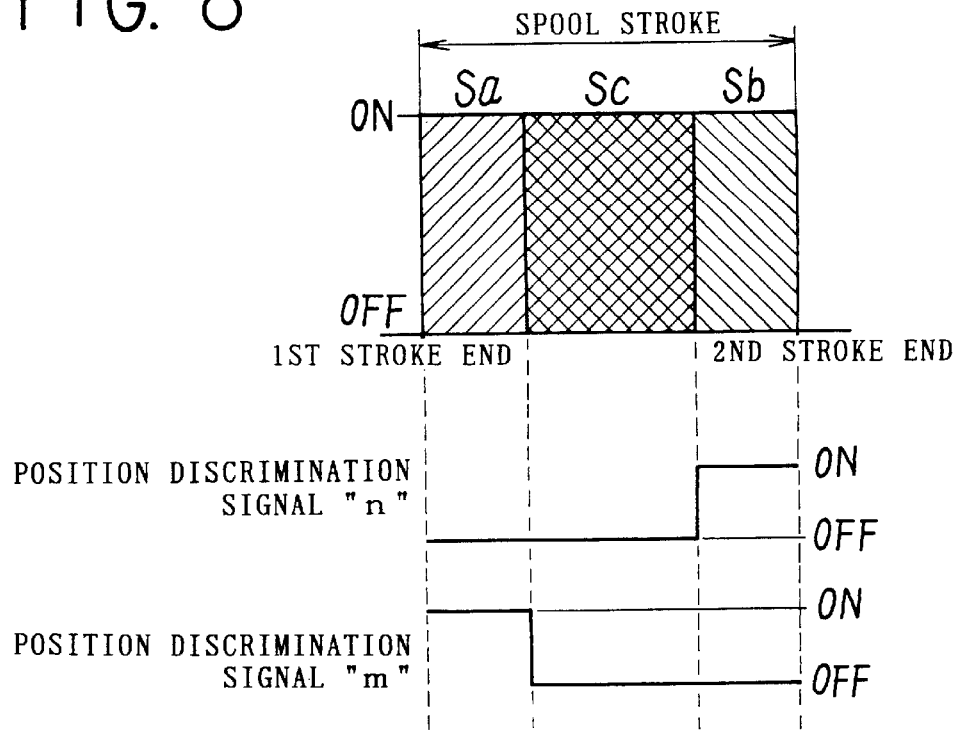
FIG. 8 is a diagram showing still another position signal applicable to the present invention.

In the above-described second embodiment, there is shown the case where two position sensors 16a and 16b output analog type position signals Sa and Sb, but the position detecting means may be of the type which outputs on/off digital type position signals Sa and Sb, as shown in FIGS. 7 and 8. FIG. 7 shows the case where two position sensors output position signals Sa and Sb only at any one stroke end of the spool 6. On the other hand, FIG. 8 shows the case where position signals Sa and Sb from the two position sensors overlap at the intermediate portion of a stroke. By neglecting the position signal at the overlap portion Sc, the positions of the spool 6 at both stroke ends can be detected.

Meanwhile, in each of the above-described embodiments, if both position discrimination signals n and m are in "off" state, it means that the spool is on the way of a stroke. By performing computations on the time during this period, it is also possible to simultaneously detect the moving time and the moving speed of the spool 6.

In the above-described embodiments, the positions of the spool 6 at both stroke ends are arranged to be detected. However, the present invention can be applied even to the case where any one of the stroke ends is only detected and where the time to the time point when the spool begins to move therefrom, or the time to the time point when it arrives thereat is measured. Moreover, the present invention can be applied even to the case where one or plural operating positions on the way of a stroke is detected, and where the times to the time points when the spool arrives at these positions or the times to the time points when it leaves (moves from) the positions are measured. In these cases, it is natural that the number of measuring units or comparators in the signal processing circuit is changed depending on the number of detecting positions.

Operating positions of the spool 6 do not necessarily require to be directly detected, but they may be indirectly detected by detecting operating positions of the piston 7a or 7b.

The solenoid valve to which the present invention is applicable is not limited to the single-pilot type solenoid valve, but a double-pilot type solenoid valve having two pilot valves may be used. Alternatively, a direct-acting type solenoid valve in which the spool is directly driven by electromagnetic or mechanical driving means may be employed.

Also, the valve member is not limited to such a spool as described above. The valve member in the present invention may be of the poppet type in which fluid passages are changed over, or may be of another type.

In the above-described embodiments, as position detecting means, the magnetically detecting type which comprises a magnet and a magnetic sensor was shown, but the position detecting means is not limited to such a type. Various types of detecting means may be used, such as the optically detecting type which uses a optical sensor, the capacitively detecting type, or the type which measures the change in impedance of the circuit which generates a alternating magnetic field.

As described hereinbefore in detail, in accordance with the present invention, it is possible to easily and reliably detect the abnormality of a solenoid valve before a failure happens, by detecting operating times of the solenoid valve and thereby discriminating whether the changeover operation thereof is normal or abnormal.

What is claimed is:

1. A device for managing the operation of a solenoid valve comprising:

position detecting means for detecting an operating position of a valve member for a flow passage changeover operation, said position detecting means being attached to the solenoid valve;

a signal processing circuit for measuring an operating time of the valve member based on a position signal from said position detecting means, and for discriminating from said operating time whether the changeover operation of the valve member is normal or abnormal, said signal processing circuit comprising:

a measuring section which starts a time measurement using an on/off driving signal for the solenoid valve as a starting signal, and which measures the operating time up to the changeover operation of the valve member based on the position signal outputted by said position detecting means;

a comparing section which has a plurality of standard values for a preset operating time, and which discriminates whether the changeover operation of the valve member is normal or abnormal by comparing the operating time of the valve member measured by said measuring section with said plurality of standard values; and a signal outputting portion for outputting a display signal indicating whether the changeover operation of the valve member is normal or abnormal, based on the discrimination result obtained by said comparing section, wherein the plurality of standard values comprise a first standard value which indicates an upper limit of a normal operating time, and a second standard value which is higher than the first standard value and which indicates an upper limit of an abnormality-predicted time, said abnormality-predicted time not being abnormal but being in a prestage of an abnormality, wherein said comparing section outputs a normal signal when the operating time of the valve member measured in said measuring section is lower than or equal to the first standard time, outputs an abnormality predicting signal when the operating time of the valve member is higher than the first standard value and lower than or equal to the second standard value, and outputs an abnormality signal when the operating time of the valve member is higher than the second standard time, wherein said position detecting means detects the positions of the valve member at both stroke ends, wherein the measuring section of said signal processing circuit comprises a first measuring unit for measuring a time from when the driving signal for the solenoid valve is turned on to when the valve member begins to move from a first stroke end; a second measuring unit for measuring a time from when the valve member begins to move from the first stroke end to when the valve member arrives at a second stroke end; a third measuring unit for measuring a time from when the driving signal for the solenoid valve is turned off to when the valve member starts a return movement from the second stroke end; and a fourth measuring unit for measuring a return time from the second stroke end to when the valve member arrives at the first stroke end, and wherein said comparing section includes first to fourth comparators for comparing the operating times measured by said measuring units with said plurality of standard values, each of said comparators being connected to each of said measuring units.

2. A device for managing the operation of a solenoid valve claimed in claim 1, wherein said plurality of standard values each set in said first to fourth comparators comprise the first standard value which indicates an upper limit of the normal operating time, and the second standard value which is higher than the first standard value and which indicates an upper limit of the abnormality-predicted time, said abnormality-predicted time not being abnormal but being in a prestage of an abnormality; and each of said first to fourth comparing units outputs a normal signal when the operating time of the valve member measured in said first to fourth measuring units is lower than or equal to the first standard time, outputs an abnormality predicting signal when the operating time of the valve member is higher than the first standard value and lower than or equal to the second standard value, and outputs an abnormality signal when the operating time of the valve member is higher than the second standard time.

3. A device for managing the operation of a solenoid valve claimed in claim 1, wherein said position detecting means comprises a magnet disposed on said solenoid valve so as to move in synchronization with the valve member, and at least one position sensor for detecting magnetic flux from said magnet.

4. A device for managing the operation of a solenoid valve claimed in claim 3, wherein said magnet is installed at a position shut off from fluid passages at one end portion of said valve member, and wherein said position sensor is installed at a position adjacent to said magnet, in the casing of the solenoid valve.

5. A device for managing the operation of a solenoid valve comprising:

a position sensor configured to detect an operating position of a valve member for a flow passage changeover operation, said position sensor being attached to the solenoid valve;

a signal processing circuit configured to measure an operating time of the valve member based on a position signal from said position sensor, and configured to discriminate from said operating time whether the changeover operation of the valve member is normal or abnormal, said signal processing circuit comprising:

a measuring section configured to start a time measurement using an on/off driving signal for the solenoid valve as a starting signal, and configured to measure the operating time up to the changeover operation of the valve member based on the position signal outputted by said position sensor;

a comparing section including a plurality of standard values for a preset operating time, and configured to discriminate whether the changeover operation of the valve member is normal or abnormal by comparing the operating time of the valve member measured by said measuring section with said plurality of standard values; and a signal outputting portion configured to output a display signal indicating whether the changeover operation of the valve member is normal or abnormal, based on the discrimination result obtained by said comparing section, wherein the plurality of standard values comprise a first standard value which indicates an upper limit of a normal operating time, and a second standard value which is higher than the first standard value and which indicates an upper limit of an abnormality-predicted time, said abnormality-predicted time not being abnormal but being in a prestage of an abnormality, wherein said comparing section outputs a normal signal when the operating time of the valve member measured in said measuring section is lower than or equal to the first standard time, outputs an abnormality predicting signal when the operating time of the valve member is higher than the first standard value and lower than or equal to the second standard value, and outputs an abnormality signal when the operating time of the valve member is higher than the second standard time, wherein said position sensor detects the positions of the valve member at both stroke ends, wherein the measuring section of said signal processing circuit comprises a first measuring unit configured to measure a time from when the driving signal for the solenoid valve is turned on to when the valve member begins to move from a first stroke end; a second measuring unit configured to measure a time from when the valve member begins to move from the first stroke end to when the valve member arrives at a second stroke end; a third measuring unit configured to measure a time from when the driving signal for the solenoid valve is turned off to when the valve member starts a return movement from the second stroke end; and a fourth measuring unit configured to measure a return time from the second stroke end to when the valve member arrives at the first stroke end, and wherein said comparing section includes first to fourth comparators configured to compare the operating times measured by said measuring units with said plurality of standard values, each of said comparators being connected to each of said measuring units.

6. A device for managing the operation of a solenoid valve claimed in claim 5, wherein:

said plurality of standard values each set in said first to fourth comparators comprise the first standard value which indicates an upper limit of the normal operating time, and the second standard value which is higher than the first standard value and which indicates an upper limit of the abnormality-predicted time, said abnormality-predicted time not being abnormal but being in a prestage of an abnormality; and each of said first to fourth comparing units outputs a normal signal when the operating time of the valve member measured in said first to fourth measuring units is lower than or equal to the first standard time, outputs an abnormality predicting signal when the operating time of the valve member is higher than the first standard value and lower than or equal to the second standard value, and outputs an abnormality signal when the operating time of the valve member is higher than the second standard time.

7. A device for managing the operation of a solenoid valve claimed in claim 5, wherein said position sensor comprises a magnet disposed on said solenoid valve so as to move in synchronization with the valve member, and at least one sensor configured to detect a magnetic flux from said magnet.

8. A device for managing the operation of a solenoid valve claimed in claim 7, wherein said magnet is installed at a position shut off from fluid passages at one end portion of said valve member, and wherein said at least one sensor is installed at a position adjacent to said magnet, in the casing of the solenoid valve.

9. A device for managing an operation of a solenoid valve, comprising:

position detecting means for detecting an operating position of a valve member for a flow passage changeover operation, said position detecting means being attached to the solenoid valve;

a signal processing circuit for measuring an operating time of the valve member based on a position signal from said position detecting means, and discriminating from said operating time whether the changeover operation of the valve member is normal or abnormal, said signal processing circuit comprising:

a measuring section which starts a time measurement using an on/off driving signal for the solenoid valve as a starting signal, and which measures the operating time up to the changeover operation of the valve member based on the position signal outputted by said position detecting means;

a comparing section which has a plurality of standard values for a preset operating time, and which discriminates whether the changeover operation of the valve member is normal or abnormal by comparing the operating time of the valve member measured by said measuring section with said a plurality of standard values; and a signal outputting portion for outputting a display signal indicating whether the changeover operation of the valve member is normal or abnormal, based on the discrimination result obtained by said comparing section, wherein said position detecting means detects the positions of the valve member at both stroke ends, wherein the measuring section of said signal processing circuit comprises a first measuring unit for measuring a time from when the driving signal for the solenoid valve is turned on to when the valve member begins to move from a first stroke end; a second measuring unit for measuring a time from when the valve member begins to move from the first stroke end to when the valve member arrives at a second stroke end; a third measuring unit for measuring a time from when the driving signal for the solenoid valve is turned off to when the valve member starts a return movement from the second stroke end; and a fourth measuring unit for measuring a return time from the second stroke end to when the valve member arrives at the first stroke end, and wherein said comparing section includes first to fourth comparators for comparing the operating times measured by said measuring units with said plurality of standard values, each of said comparators being connected to each of said measuring units.

10. A device for managing the operation of a solenoid valve claimed in claim 9, wherein:

said plurality of standard values each set in said first to fourth comparators comprise the first standard value which indicates an upper limit of the normal operating time, and the second standard value which is higher than the first standard value and which indicates an upper limit of the abnormality-predicted time, said abnormality-predicted time not being abnormal but being in a prestage of an abnormality; and each of said first to fourth comparing units outputs a normal signal when the operating time of the valve member measured in said first to fourth measuring units is lower than or equal to the first standard time, outputs an abnormality predicting signal when the operating time of the valve member is higher than the first standard value and lower than or equal to the second standard value, and outputs an abnormality signal when the operating time of the valve member is higher than the second standard time.

* * * * *